United States Patent
Walden et al.

(10) Patent No.: US 10,958,503 B2
(45) Date of Patent: Mar. 23, 2021

(54) MIB-ORIENTED PROTOCOL FOR HTTP MANAGEMENT

(71) Applicant: Hirschmann Automation and Control GmbH, Neckartenzlingen (DE)

(72) Inventors: Andreas Walden, Pliezhausen (DE); Michael Ries, Tuebingen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 0 days.

(21) Appl. No.: 16/095,458

(22) PCT Filed: Apr. 21, 2017

(86) PCT No.: PCT/EP2017/059488
§ 371 (c)(1),
(2) Date: Nov. 8, 2018

(87) PCT Pub. No.: WO2017/182615
PCT Pub. Date: Oct. 26, 2017

(65) Prior Publication Data
US 2019/0132187 A1    May 2, 2019

(30) Foreign Application Priority Data
Apr. 22, 2016    (DE) .................. 10 2016 206 898.9

(51) Int. Cl.
*H04L 12/24*    (2006.01)
*G06F 11/00*    (2006.01)

(52) U.S. Cl.
CPC .......... *H04L 41/0213* (2013.01); *G06F 11/00* (2013.01); *H04L 41/0246* (2013.01); *H04L 41/046* (2013.01)

(58) Field of Classification Search
CPC ............. H04L 41/0213; H04L 41/0246; H04L 41/046; G06F 11/00
USPC ........................................................ 709/223
See application file for complete search history.

(56) References Cited

U.S. PATENT DOCUMENTS

| | | | |
|---|---|---|---|
| 6,008,805 A | 12/1999 | Land | |
| 6,694,304 B1* | 2/2004 | Sethi | H04L 41/0213 |
| 7,739,362 B1* | 6/2010 | Zhang | H04L 41/0213 370/245 |
| 8,261,203 B2* | 9/2012 | Schneider | H04L 41/0213 370/401 |
| 8,799,437 B1* | 8/2014 | Kumbhari | H04L 41/0853 709/223 |
| 2003/0177214 A1* | 9/2003 | Chen | H04L 41/0213 709/223 |

(Continued)

FOREIGN PATENT DOCUMENTS

| | | | | |
|---|---|---|---|---|
| EP | 1154601 A | 11/2001 | | |
| WO | WO-2009030027 A1 * | 3/2009 | | G06F 1/28 |

*Primary Examiner* — Zi Ye
(74) *Attorney, Agent, or Firm* — Andrew Wilford (57) ABSTRACT

Method for transmitting data packets between a network management station monitoring a network and network devices on which agents are installed, the network management station communicating with the agent of a network device via instructions; said method is characterized in that the network management station accesses a management information base of a network device by means of a configurable instruction and retrieves data packets corresponding to the configuration of the instruction.

3 Claims, 9 Drawing Sheets

(56) References Cited

U.S. PATENT DOCUMENTS

2011/0295989 A1   12/2011   Kiyoto

\* cited by examiner

Data is transferred via one request/response communication.
Only the desired data is transferred.

Fig. 4

| ASN.1 type | ASN.1 Object | ASN.1 String |
|---|---|---|
| OCTET STRING | {0x41, 0x5A} | "41 5A" |
| BITS(same conversion as OCTET STRING) | {0x7, 0xA} | "07 0A" |
| OBJECT IDENTIFIER | {3, 5} | "3.5" |
| IP ADDRESS | {0xff,0xff,0x00,0x00} | "255.255.0.0" |
| INTEGER | -3 | "-3" |
| TimeTicks | 3 | "3" |
| Gauge | 3 | "3" |
| Counter | 3 | "3" |

Fig. 5A

MOP Data Model [XSD Schema]
xml version="1.0" encoding="UTF—8"
<xs:schema xmlns:xs="http://www.w3.org/2001/XML Schema"
xmlns:netconf="urn:ietf:params:xml:ns:netconf:base:1.0" xmlns="urn:x-mops:1.0" targetNamespace="urn:x—mops:1.0" elementFormDefault="qualified"
attributeFormDefault="unqualified" xml:lang="en" version="1.1">
   <xs:import schemaLocation="netconf.xsd"
namespace="urn:ietf:params:xml:ns:netconf:base:1.0"/>

```
    <xs:simple Type name="SNMPErrorStatus">
        <xs:restriction base="xs:string">
        <xs:enumeration value<"noError"/>
        <xs:enumeration value="tooBig"/> _
        <xs:enumeration value="noSuchName"/>
        <xs:enumeration value="badValue"/>
        <xs:enumeration value="readOnly"/>
        <xs:enumeration value="genError"/>
        <xs:enumeration value="wrongValue"/>
        <xs:enumeration value="wrongEncodomg"/>
        <xs:enumeration value="wrongType"/> ·
        <xs:enumeration value="wrongLength"/>
        <xs:enumeration value="inconsistentValue"/>
        <xs:enumeration value="noAccess"/>
        <xs:enumeration value="notWriable"/>
        <xs:enumeration value="noCreation"/>
        <xs:enumeration value="inconsistentName"/>
        <xs:enumeration value="resourceUnavailable"/>
        <xs:enumeration value="commitFailed"/>
        <xs:enumeration value="undoFailed"/>
        <xs:enumeration value="authoizationError"/>
     </xs:restriction>
  </xs:simpleType>

<xs:element name="mibOperation" substitutionGroup="netconf:rpcOperation">
    <xs:complexType>
      <xs:complexContent>
        <xs:extension base="netconf:rpcOperationType">
          <xs:sequence>
            <xs:element name="get~config" minOccurs="0">
              <xs:annotation>
                <xs:documentation>Request configuration data.
                </xs:documentation>
              </xs:annotation>
              <xs:complexType>
```

Fig. 5B

```xml
<xs:sequence>
  <xs:element name="source">
    <xs:annotation>
      <xs:documentation>
        Source of the data.
      </xs:documentation>
    </xs:annotation>
    <xs:complexType>
      <xs:annotation>
        <xs:documentation>
          Source types.
        </xs:documentation>
      </xs:annotation>
      <xs:choice>
        <xs:element name="running-config"/>
        <xs:element name="default—config"/>
      </xs:choice>
    </xs:complexType>
  </xs:element>
  <xs:alement name="MIBData">
    <xs:annotation>
      <xs:documentation>Filter for the requested data.</xs:documentation>
    </xs:annotation>
    <xs:complexType>
      <xs:sequence maxOccurs="unbounded" minOccurs="0">
        <xs:element name="MIB">
          <xs:complexType>
            <xs:sequence maxOccurs="unbounded" minOccurs="0">
              <xs:element name="Node">
                <xs:annotation>
                  <xs:documentation>Contain a set of attributes with the same path (except subId) in the MIB tree.</xs:documentation>
                </xs:annotation>
                <xs:complexType>
                  <xs:sequence maxOccurs="unbounded" minOccurs="0">
                    <xs:element name="Get" maxOccurs="unbounded">
                      <xs:annotation>
                        <xs:documentation>Represents one MIB attribute.</xs:documentation>
```

Fig. 5C

```
                              </xs:annotation>
                              <xs:complexType>
                                <xs:attribute name="name"
use="required">
                                  <xs:annotation>
                                    <xs:documentation>Name of the
attribute according to the MIB without namespace.</xs:documentation>
                                  </xs:annotation>
                                </xs:attribute>
                              </xs:complexType>
                            </xs:element>
                          </xs:sequence>
                          <xs:attribute name="name"/>
                        </xs:complexType>
                      </xs:element>
                    </xs:sequence>
                    <xs:attribute name="name" use="required"/>
                  </xs:complexType>
                </xs:element>
              </xs:sequence>
            </xs:complexType>
          </xs:element>
        </xs:sequence> -
      </xs:complexType>
    </xs:element>
    <xs:element name="edit-config" minOccurs="0">
      <xs:annotation>
        <xs:documentation>Modify configuration data.
        </xs:documentation>
      </xs:annotation>
      <xs:complexType>
        <xs:sequence maxOccurs="1" minOccurS="1">
          <xs:element name="MIBData">
            <xs:annotation>
            <xs:documentation>Filter for the requested
data.</xs:documentation>
            </xs:annotation>
            <xs:complexType>
              <xs:sequence maxOocurs="unbounded" minOccurs="0">
                <xs:element name="MIB">
                  <xs:complexType>
                    <xs:sequence maxOocuxs="unbounded"
minOccurs="0">
                      <xs:element name="Node">
                        <xs:annotation>
```

Fig. 5D

```
                              <xs:documentation>Contain a set of
attributes with the same path (except subId) in the MIB ·
tree.</xs:documentation>
                                  </xs:annotation>
                              <xs:complexType>
                                  <xs:sequence maxOocurs="unbounded"
minOccurS="0">
                                      <xs:elsment minOccursi"0" name="Index">
                                          <xs:complexType>
                                              <xs:sequence maxOccurs"unbounded"
minOccurs="1">
                                                  <xs:element name="Attribute">
                                                      <xs:complexType mixed="true">
                                                          <xs:attribute name="name"/>
                                                      </xs:complexType>
                                                  </xs:element>
                                              </xs:sequence>
                                          </xs:complexType>
                                      </xs:element>
                                    . <xs:element name="Set"
maxOcours="unbounded">
                                          <xs:annotation>
                                              <xs:documentation>Represents one
MIB attribute. Content is the new value for the
attribute.</xs:documentation>
                                          </xs:annotation>
                                          <xs:complexType mixed="true">
                                              <xs:attribute name="name"
use="required">
                                                  <xs:annotation>
                                                      <xs:documentation>Name of the
attribute according to the MIB without namespace.</xs:documentation>
                                                  </xs:annotation>
                                              </xs:attribute>
                                          </xs:complexType>
                                      </xs:element>
                                  </xs:sequence>
                                  <xs:attribute name="name"/>
                              </xs:complexType>
                          </xs:element>
                      </xs:sequence>
                      <xs:attribute nams="name" use="required"/>
                  </xs:complexType>
```

Fig. 5E

```
        </xs:element>
       </xs:sequence>
      </xs:complexType>
     </xs:element>
    </xs:sequence>
   </xs:complexType>

</xs:element>
   </xs:sequence> ·

</xs:extension>
   </xs:complexContent>
  </xs:complexType>

</xs:element>
 <xs:element name="mibResponse" substitutionGroup="netconf:rpcResponse">
  <xs:complexType>
   <xs:complexContent>
    <xs:extension base="netconf:rpcResponseType">
     <xs:sequence>
      <xs:element name="MIBData">
       <xs:complexType>
        <xs:sequence maxOccurs="unbounded" minOccurs="0">
         <xs:element name="MIB">
          <xs:annotation>
           <xs:documentation>Represents one single MIB definition</xs:documentation>
          </xs:annotation>
          <xs:complexType>
           <xs:sequence minOccurs"0" maxOccurs;"unbounded">
            <xs:element name="Node">
             <xs:annotation>
              <xs:documentation>Used for table definitions (parent name ends with "Entry") and 0 or more instances can exists (except instance "0").</xs:documentation>
             </xs:annotation>
             <xs:complexType>
              <xs:sequence maxOccurs="unbounded" minOccurs="0">
               <xs:element name="Entry">
                <xs:annotation>
```

Fig. 5F

```
                    <xs:documentation>Represents a single
instance of the table definition. </xs:documentation>
                    </xs:annotation>
                    <xs:complexType>
                        <xs:sequence minOccurs="0"
maxOccurs="unbounded">
                            <xs:element name="Attribute">
                                <xs:annotation>
                                    <xs:documentation>Represents one
MIB attribute. The value of MIB attribute is the text content of the XML
attribute as a an ASN.1 value ( until not required with the convert
attribute).</xs:documentation>
                                </xs:annotation>
                                <xs:complexType mixed="true">
                                    <xs:sequence minOccurs="0">
                                        <xs:element
ref="extendedErrorHandling"/>
                                    </xs:sequence>
                                    <xs:attribute name="name"
use="required">
                                        <xs:annotation>
                                            <xs:documentation>Name of the
attribute according to the MIB without namespace.</xs:documentation>
                                        </xs:annotation>
                                    </xs:attribute>
                                    <xs:attribute name="error"
type="xs:string"/>
                                </xs:complexType>
                            </xs:element>
                        </xs:sequence>
                    </xs:complexType>
                </xs:element>
            </xs:sequence>
            <xs:attribute name="name" use;"required"
type="xs:string"/>
            <xs:attribute neme="error" type="xs:string"/>
        </xs:complexType>
    </xs:element>
</xs:sequence>
<xs:attribute name="name" use="required"
type="xs:string">
    <xs:annotation>
        <xs:documentetion>Name of the MIB, for ex.
"SNMP v2-MIB".</xs:documentation>
    </xs:annotation>
```

Fig. 5G

```
              </xs:attribute>
              <xs:attribute name="error" type="xs:string"/>
             </xs:complexType>
            </xs:element>
           </xs:sequence>
          </xs:complexType>
         </xs:element>
        </xs:sequence>
       </xs:extension>
      </xs:complexContent>
     </xs:complexType>
    </xs:element>
      <xs:element name="error">
       <xs:complexType>
        <xs:sequence minOccurs="0"> </xs:sequence>
         <xs:attribute name="snmp-error-status">
          <xs:SimpleType>
            <xs:restriction base="SNMPErrorStatus"> </xs:restriction>
          </xs:simpleType>
         </xs:attribute>
       </xs:complexType>
      </xs:element>
      <xs:element name="extendedErrorHandlimg">
         <xs:annotation>
              <xs:documentation>Element to support the extended error MIB.
</xs:documentation> .
         </xs:annotation>
         <xs:complexType>
             <xs:sequence minOccurs"0" maxOccurs="unbounded">
                 <xs:element name="parameter" type="xs:string"/>
             </xs:sequence>
             <xs:attribute name="path" use="required">
                 <xs:annotation>
                      <xs:documentation>Path to the Object Identity (OID—Path, for ex.
1.3.6.xx) which reflects the error.</xs:documentation>
                 </xs:annotation>
             </xs:attribute>
         </xs:complexType>
      </xs:element>
      <xs:element name="Filter">
          <xs:complexType>
              <xs:attribute name"rpn"/>
          </xs:complexType>
      </xs:element>
</xs:schema>
```

MIB-ORIENTED PROTOCOL FOR HTTP MANAGEMENT

CROSS REFERENCE TO RELATED APPLICATIONS

This application is the US-national stage of PCT application PCT/EP2017/059488 filed 21 Apr. 2017 and claiming the priority of German patent application 102016206898.9 itself filed 22 Apr. 2016.

The invention relates to a method of transmitting data packets between a network management station monitoring a network and network devices of the network, where agents are installed on the network devices and the network management station communicates with the respective agent of a network device using commands, according to the features of the preamble of patent claim 1.

A superordinate network management station is used to monitor network devices, the remote control and remote configuration of network devices and to detect errors and report errors in network devices of a network, which network management station uses a network protocol to control and monitor the network devices the network devices from a central location. The simple network management protocol (SNMP) has become established in practice, wherein this protocol describes the structure of the data packets, which can be transmitted, and the communication sequence between the network management station and the connected network devices. Agents in the network devices are used for the monitoring, which agents are programs that run directly on the network devices being monitored or are hardware that performs the same task.

For communication between the network management station and the network devices, the simple network management protocol defines six different data packets that can be transmitted (get-request, get-next-request, get-bulk, set-request, get-response and trap).

For interchanging data between the network management station and the network devices, not only is the prescribed protocol required, but also a database in the respective network device, which database is referred to as a management information base (MIB) in connection with the SNMP. This MIB is a description containing definitions of management information that can be used to remotely control, monitor and configure a network device connected to a network. As likewise already described above, SNMP is used in practice for these functions since this protocol has become globally established as a standard. The management information is referred to as managed objects, wherein, in the strict sense, a managed object is not an actual data value but rather constitutes the description of a data value. This means that the management information base of a network device does not contain any data, but rather this base describes only where these data can be found in the network device and the appearance of said data.

However, it has been found in practice that the transmission of data packets on the request of a network management station to the network device and back again is limited to the largest frame size (the so-called maximum transmission unit, MTU) permissible for an individual frame of the data packet in the network. For this reason, large-volume requests by the network management station, in particular the requests involving large pieces of data, result in requests being repeatedly strung together by the network management station, and responses from the requested network device in networks result in a long waiting time, high packet losses or comparable disadvantages that are all a critical aspect.

Figure 1:
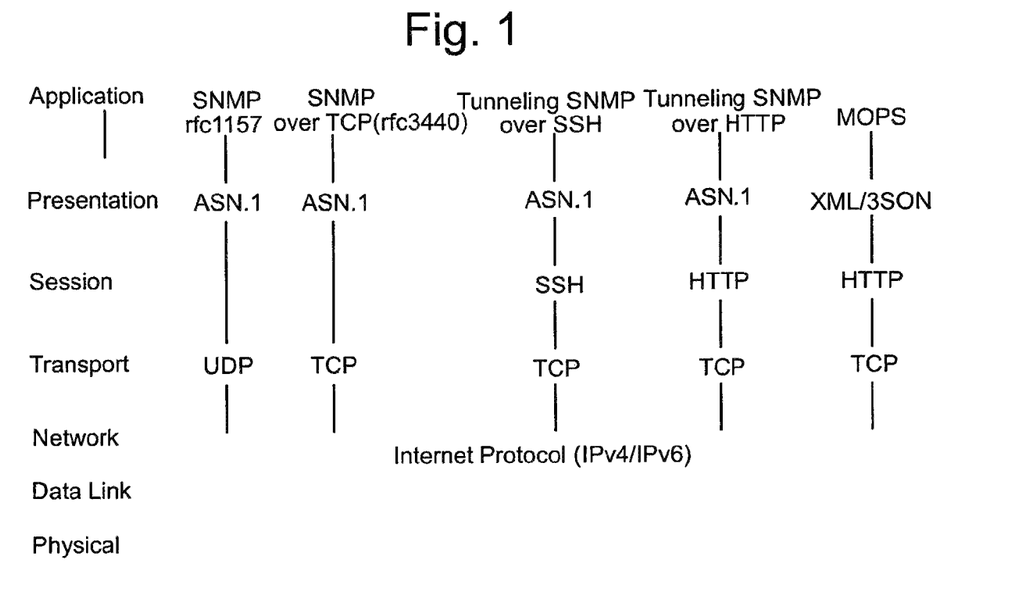
FIG. 1 shows, by way of example, a network transport layer.
Figure 2:
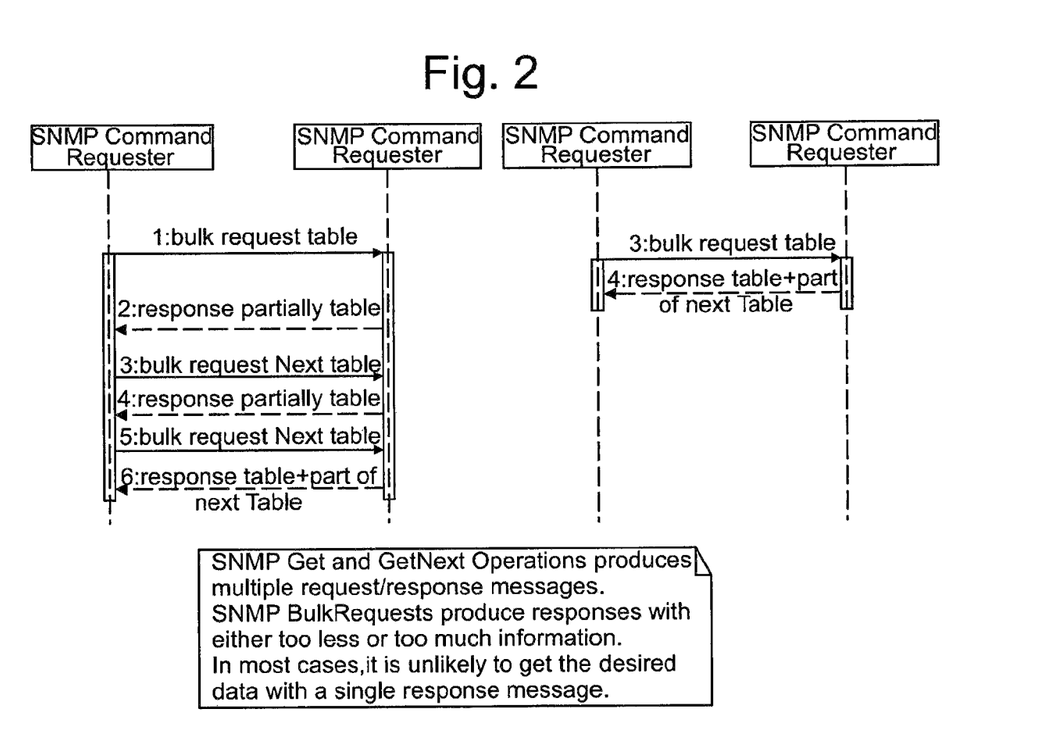
FIG. 2 shows, as already described at the outset, a table request for a network device from a network management station on the basis of SNMP, for example. The method according to the invention makes it possible to request exactly the required data (and therefore not to have to request more or less data). Therefore, no requests are advantageously made beyond the MIB nodes (see FIG. 2, SNMP "part of next table" and filter possibility).
Figure 3:
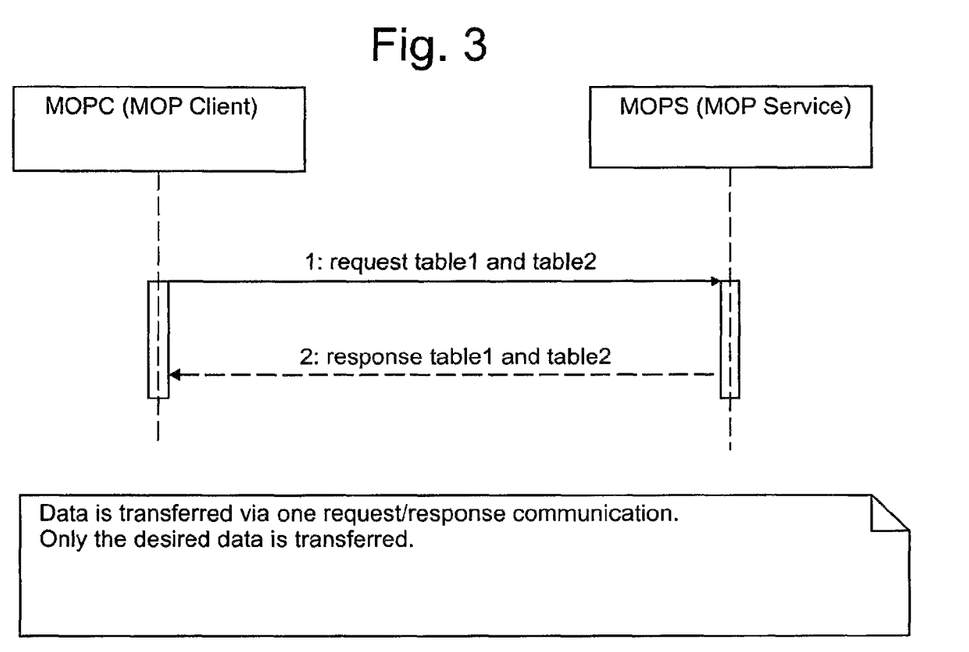
FIG. 3 shows an MOP table request according to the invention, in which case it can be directly seen that the request can be made using a request based on a configurable command, as a result of which the compilation of the desired data (here table 1 and table 2, for example) and the compiled data are transmitted back to the network management station from the network device in one step.
Figure 4:
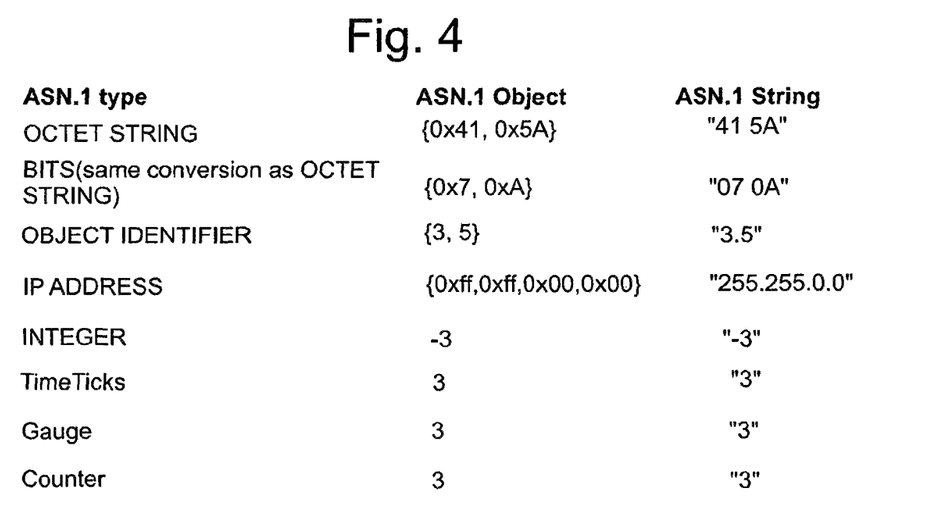
FIG. 4 shows a comparison of the data according to MIB and the MOP according to the invention.
Figure 5B:
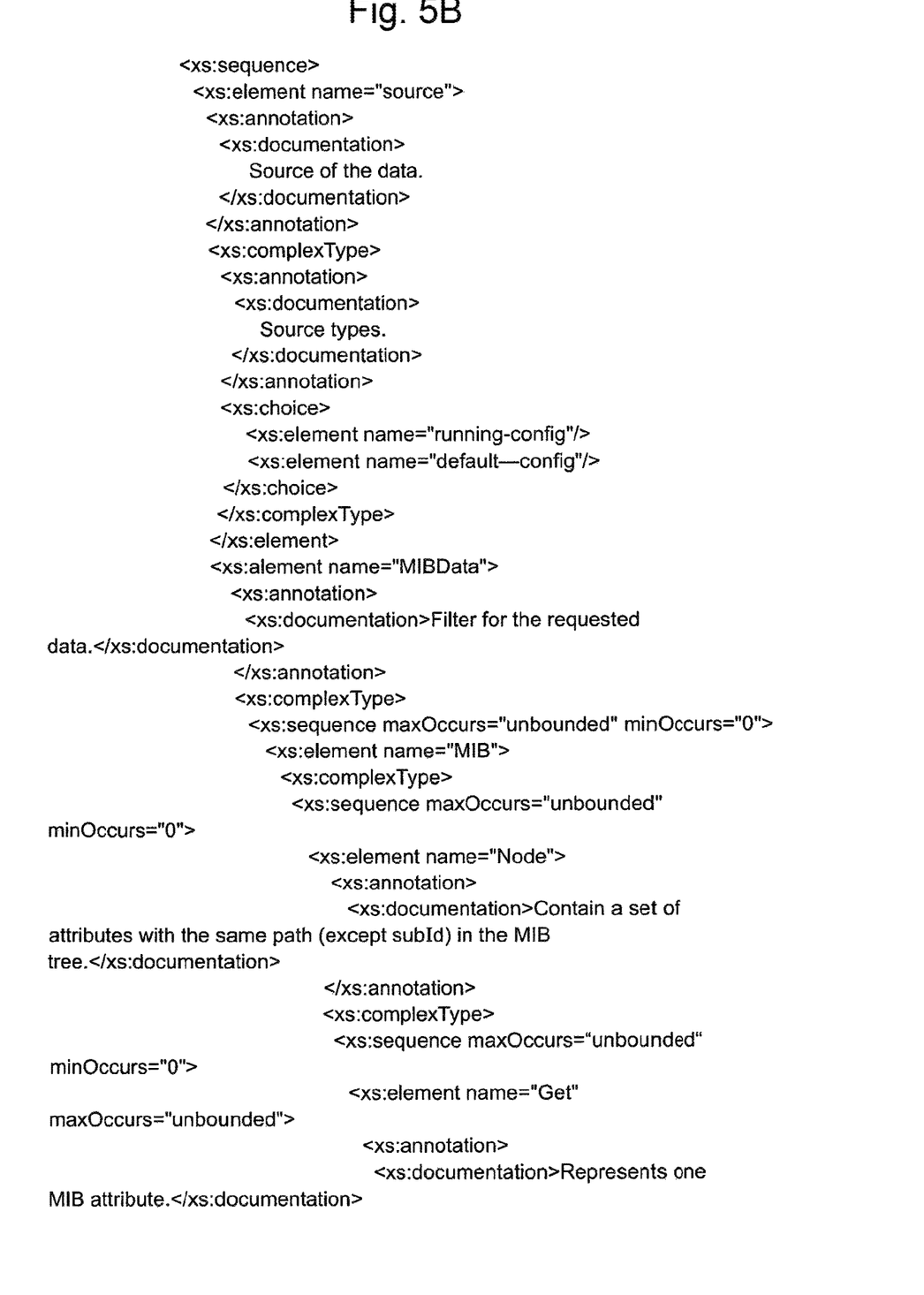
FIG. 5 finally shows an MOP data model (XSD schema) according to the invention.
Figure 5C:
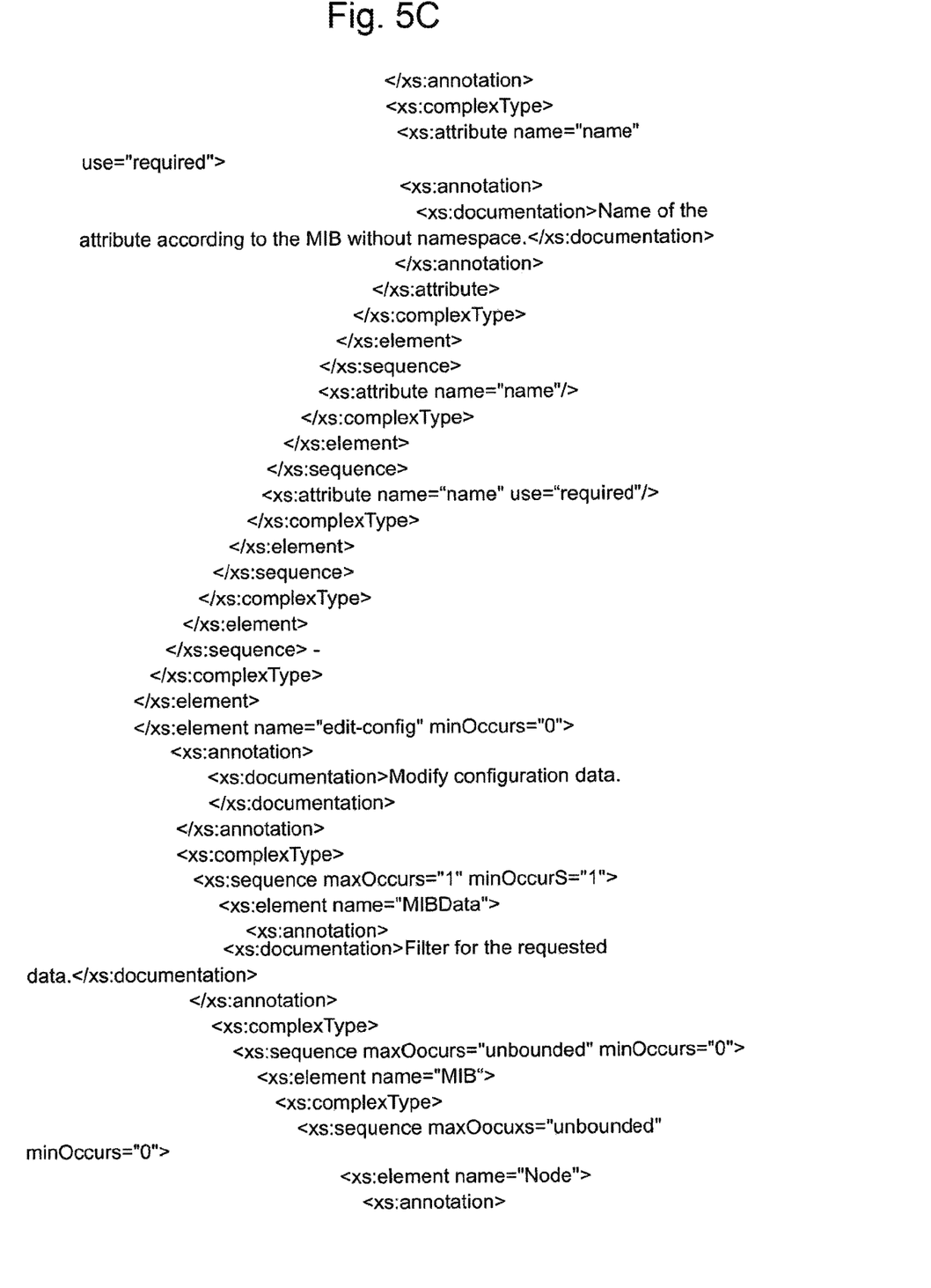
Figure 5D:
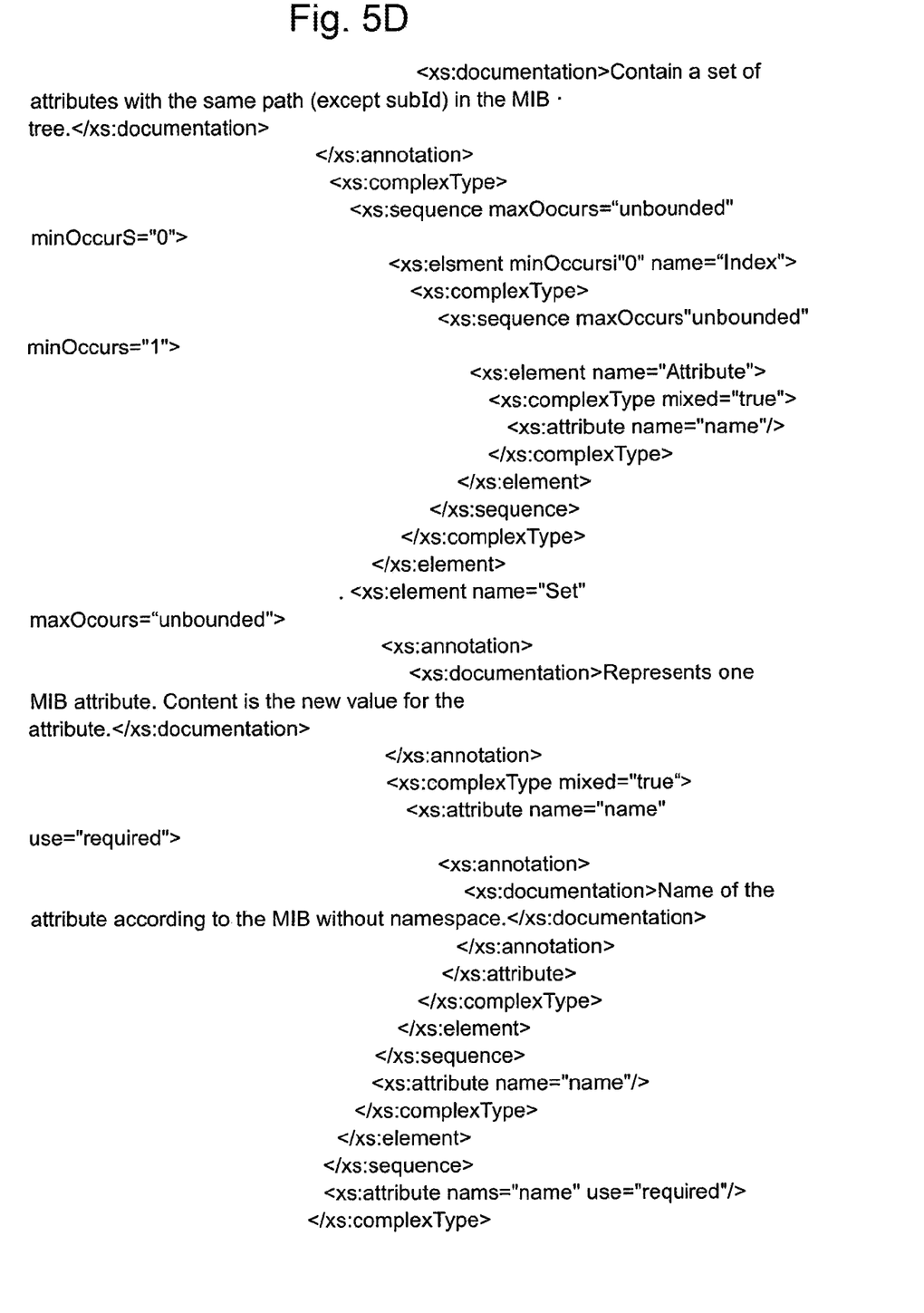
Figure 5E:
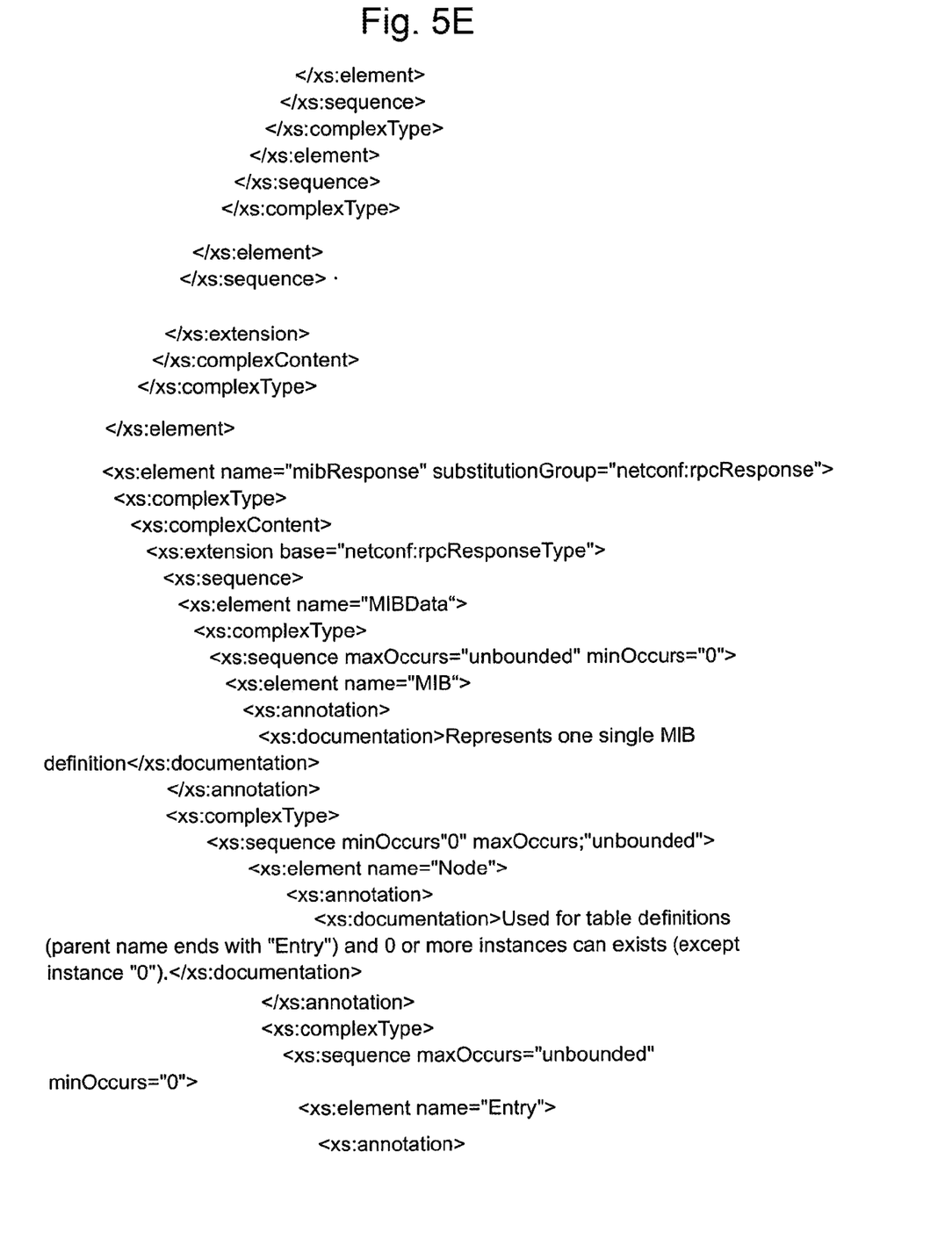
Figure 5F:
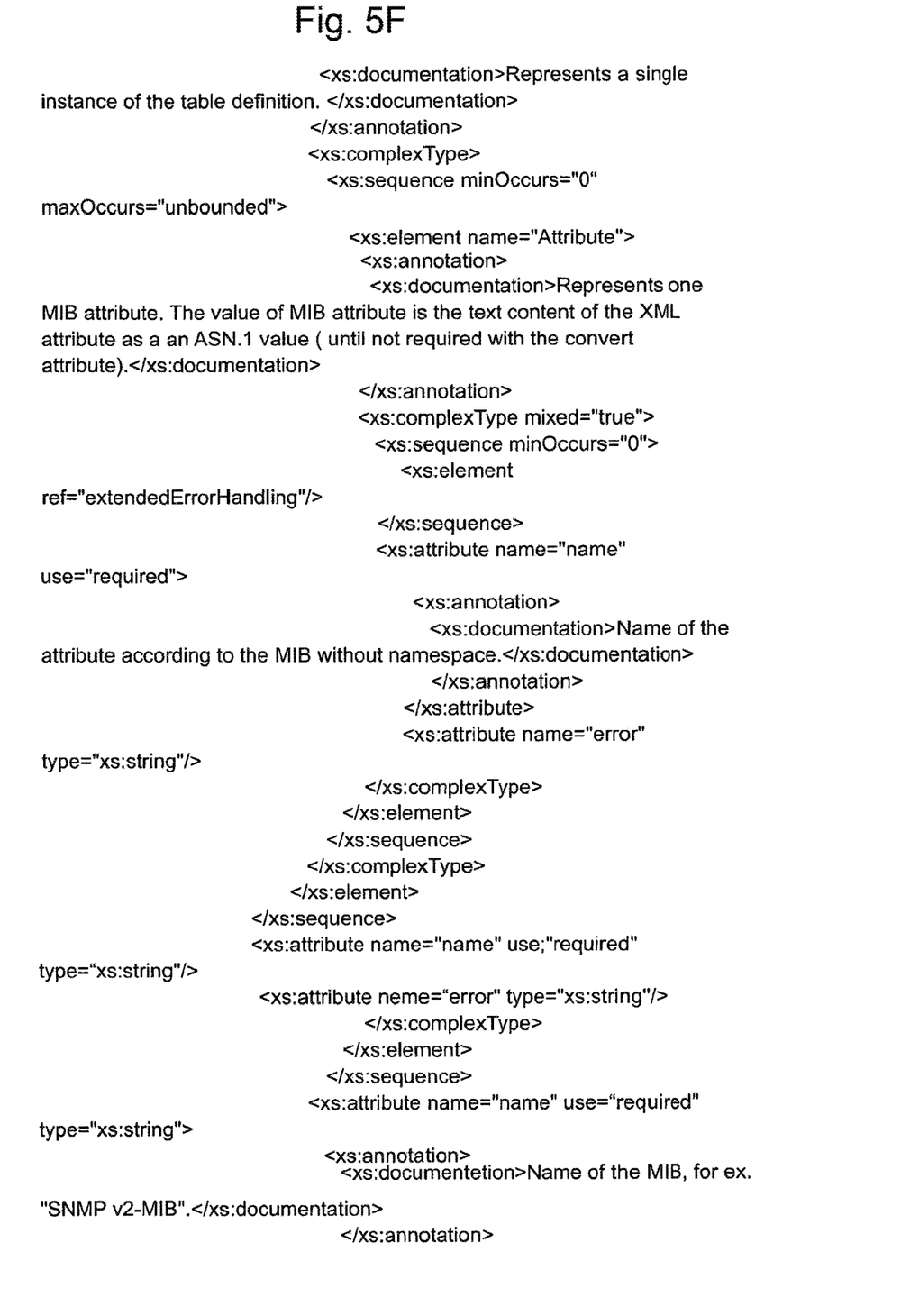
Figure 5G:
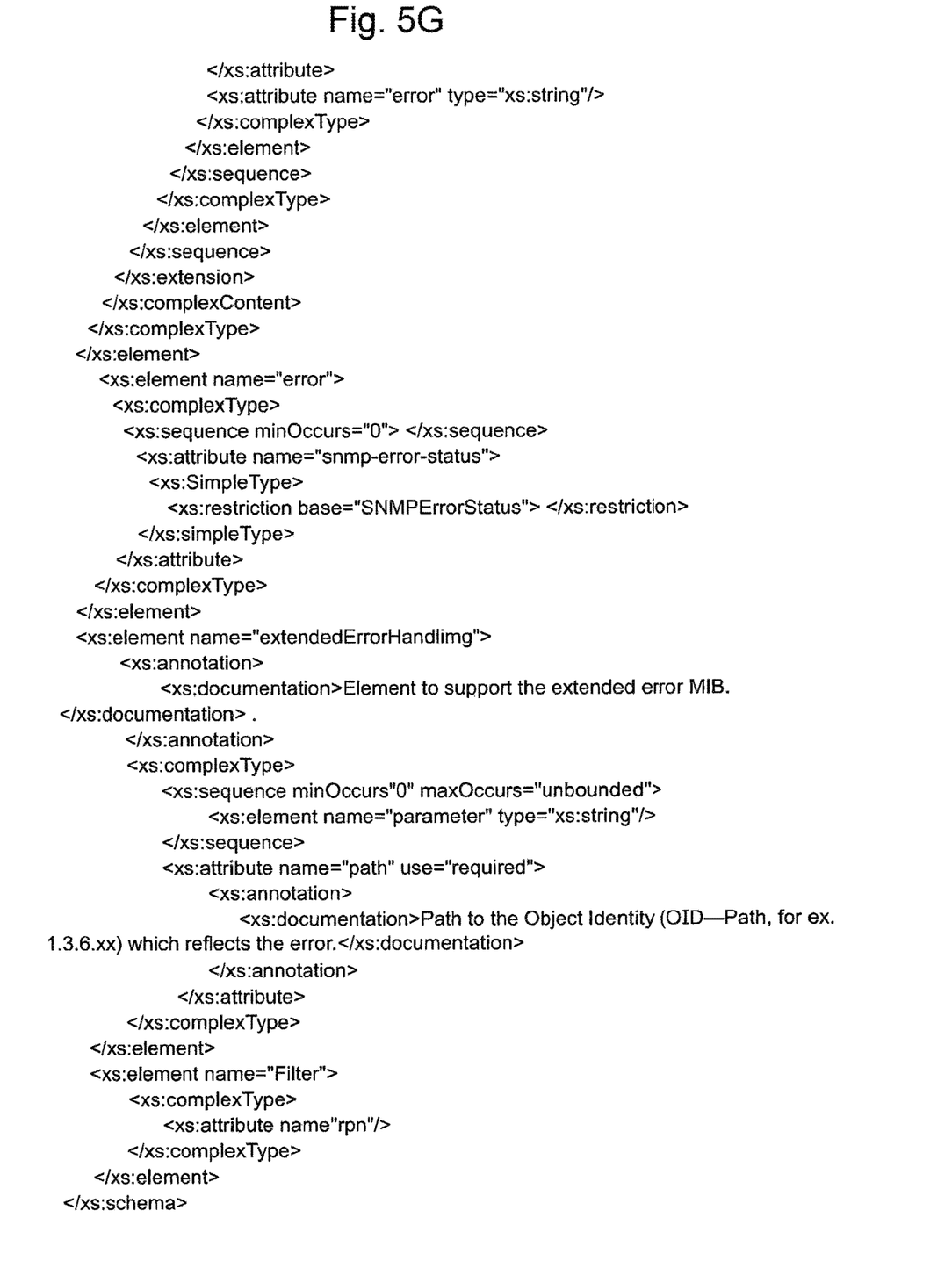

In a manner representative of an example from the prior art, reference is made to FIG. 2 that shows a known SNMP table request. The network management station (SNMP command requester) wishes to request a large number of data items (bulk request table) in a network device (SNMP supplier) that are intended to be transmitted back after the request. This disadvantageously cannot be carried out in a single request step, but rather a total of six steps (left-hand illustration in FIG. 2) are required according to the example in FIG. 2.

Depending on the desired bulk request table and its contents, the situation may occur in which the desired data can be requested and supplied in a single response message (right-hand illustration in FIG. 2), but this occurs rarely nowadays or no longer occurs at all since the data for controlling, configuring and monitoring the network devices by means of the network management station have reached such a large scale that they can no longer be transmitted in a single response message.

The invention is therefore based on the object of improving a method of transmitting data packets between a network management station monitoring a network and network devices of the network device without there being restrictions in the request, the compilation of the requested data and the return transmission of the compiled data.

This object is achieved by means of the features of patent claim 1.

The invention provides for the network management station to access a management information base of a network device using a configurable command and retrieves data packets corresponding to the configuration of the command. Whereas in the prior art, in particular when using the SNMP, not only the number but also the contents of the commands are firmly predefined, it is now possible using the configurable command according to the invention to retrieve precisely those data on the network device and to compile them and allow them to be transmitted on any desired scale. This advantageously removes the restriction given by the SNMP with respect to the number and contents of its commands. The protocol according to the invention, which can also be referred to as an MIB-oriented protocol (MOP), is therefore not subject to any such restrictions, in particular data size restrictions, of the SNMP. Therefore, the complete request is advantageously transmitted on the basis of an arbitrarily configurable command before the server processes it. With complete requests, the server can optimize the data processing, for example the stipulation of the blocking of a database, pipeline operations and the like.

If table data from the MIB of the network device are requested, the MOP according to the invention makes it possible to set up a filter for the purpose of reducing the network bandwidth to an even greater extent and optimizing the data processing since precisely those data from the network device that correspond to the configured command can be requested, compiled and transmitted, which command can take into account the existing network bandwidth, in particular. This is not possible in the case of an equivalent SNMP bulk request since here, as already described at the outset, a multiplicity of individual requests and the transmission of partial contents of the database must be carried out. This is because the desired table cannot be retrieved in a single request/response message interchange with a bulk SNMP request since this protocol does not define an end object identifier for the request and only supports a start identifier and the number of repetitions (also see FIG. 2).

In contrast, the MOP according to the invention forms the MIB building structure for an association with keys and values, wherein the keys represent the available nodes and the values represent the available branches of these nodes. These nodes can be retrieved in a single request via the MOP according to the invention.

According to the prior art, the management information base (MIB) is a data model that is very often linked to the widespread simple network management protocol (SNMP), a global standard protocol for managing devices in IP networks.

The solution according to the invention is based on a method of transmitting said MIB data and is not subject to the restrictions of current implementations (that is to say of the SNMP versions 1-3).

The MOP according to the invention achieves the advantages that there is less influence of network waiting times than would be possible using the SNMP. Minimum network traffic in comparison with SNMP is achieved. There is also the advantage that common HTTP applications are supported and there is an effortless transition from MIB-based SNMP implementations to the method of transmitting data according to the MOP. In addition, error handling that is extended in comparison with SNMP is supported in a further advantageous manner.

One development of the invention provides for the network management station to access the respective network device in a HTTP-based manner. Whereas the established and standard SNMP operates with UDP (user datagram protocol) as the transmission protocol and with a binary data format, the MOP according to the invention enables simple, HTTP-based client frameworks for accessing the MIB information.

The MOP according to the invention therefore advantageously enables a simple transition from MIB-based SNMP implementations. Since the MIB access level is frequently decoupled from the SNMP level, the implementers can directly access the MIB data in order to form a response according to the MOP. The MOP server can preferably run as a HTTP service and can use existing security and load balancing functions of the HTTP server.

One development of the invention provides for the requested data to be supplied by the management information base in a text data format. As a result, modern web browsers and web APIs can advantageously implement an MOP client. Whereas the fundamental protocol operation is based on the NETCONF RPC (remote procedure call) definition, the MOP according to the invention defines its own data model and its data representation level for representing the MIB data. Examples of a text data format are XML or JSON, but this list is not conclusive. Since the MOP according to the invention enables a simple transition from MIB-based SNMP implementations, the data format (text data format) was selected in such a manner that a direct assignment, in particular a 1:1 assignment, of the hierarchical MIB structure to the MOP data is possible.

As a further advantage, it should be mentioned that the MOP according to the invention enables a free allocation of error codes either to protocol operations or to MIB data objects, with the result that the restriction whereby SNMP response messages allow only a limited selection of error status codes has been advantageously removed. There is a direct assignment, in particular a 1:1 assignment, of SNMP to MOP error codes and this can be readily applied by the implementers. In order to support the extended error handling, that element that contains the data relating to an MIB object can be extended.

For explanation, reference is briefly made to the figures below.

The invention claimed is:

1. A method of transmitting data packets between a network management station monitoring a network and network devices of the network, the method comprising the steps of:
    installing MIB agents on the network devices;
    the network management station communicating with the respective agents of the network devices using MIB-oriented protocol commands including a configurable MIB-oriented protocol command to retrieve a plurality of user-desired tables by one request/response; and
    the network management station accessing a management information base of a network device using the configurable MIB-oriented protocol command and retrieving data packets that are not size restricted corresponding to the configuration of the MIB-oriented protocol command.

2. The method according to claim 1, wherein access is carried out in a HTTP-based manner.

3. The method according to claim 1, further comprising the step of:
    supplying the requested data by the management information base in a text data format.

* * * * *